W. T. COWPERTHWAITE.
MEANS FOR USE IN THE MANUFACTURE OF CONCRETE ROOFING TILE.
APPLICATION FILED MAR. 6, 1918.
1,403,940.    Patented Jan. 17, 1922.
4 SHEETS—SHEET 1.
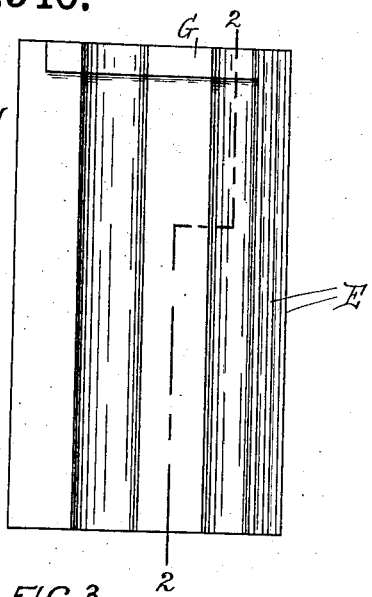
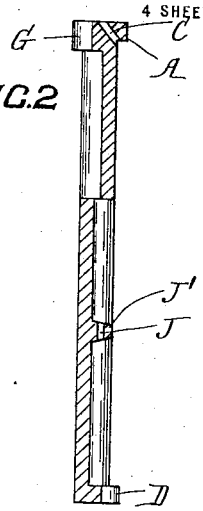
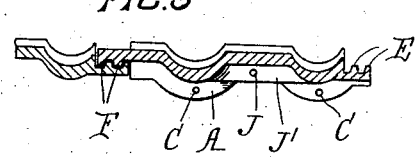
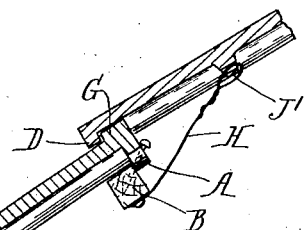
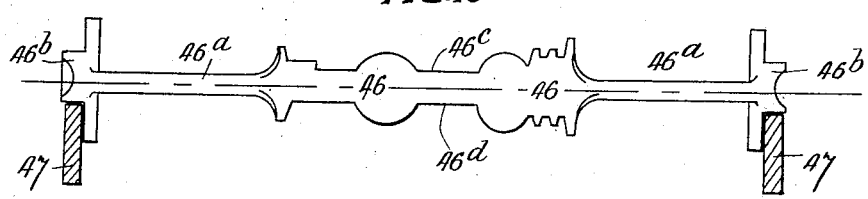
INVENTOR:
W. T. COWPERTHWAITE
BY: H Van Oldemul
ATTORNEY.

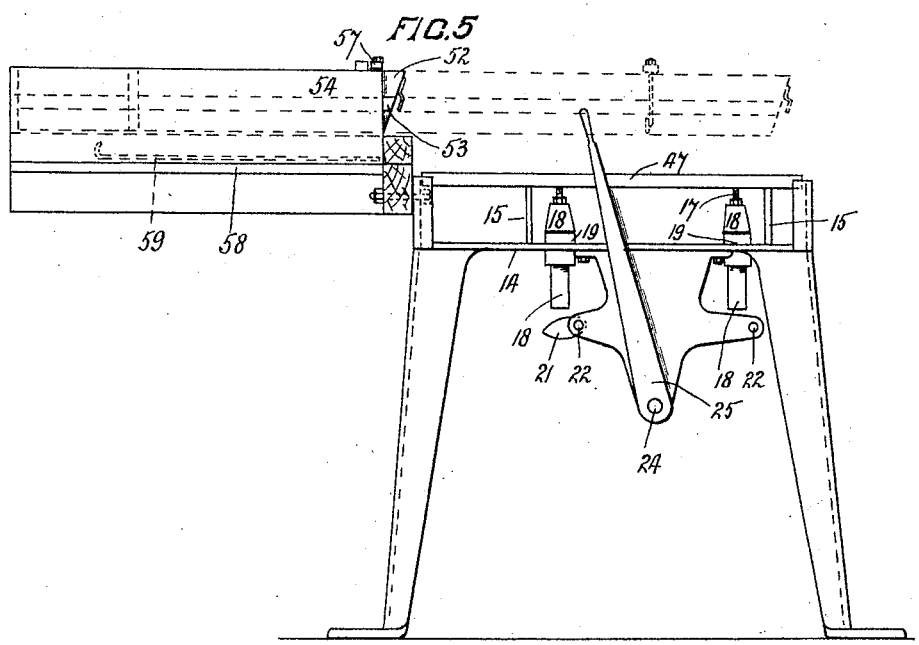
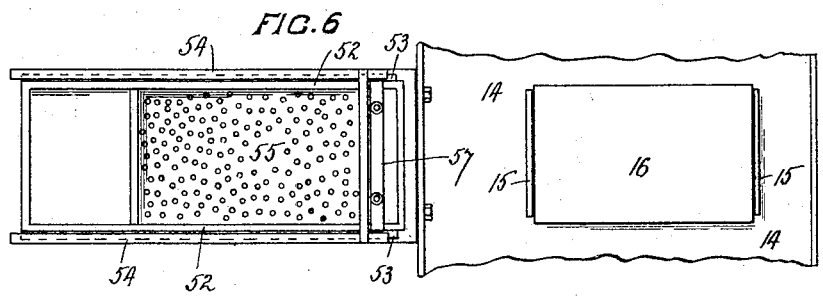
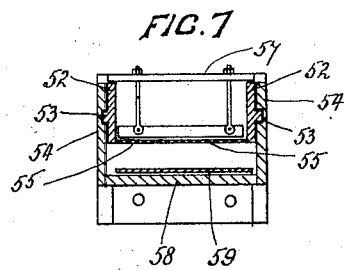

W. T. COWPERTHWAITE.
MEANS FOR USE IN THE MANUFACTURE OF CONCRETE ROOFING TILE.
APPLICATION FILED MAR. 6, 1918.
1,403,940.
Patented Jan. 17, 1922.
4 SHEETS—SHEET 3.
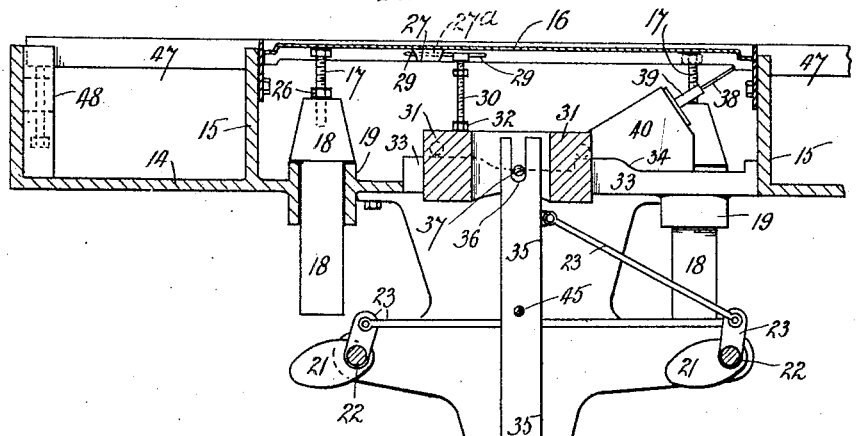
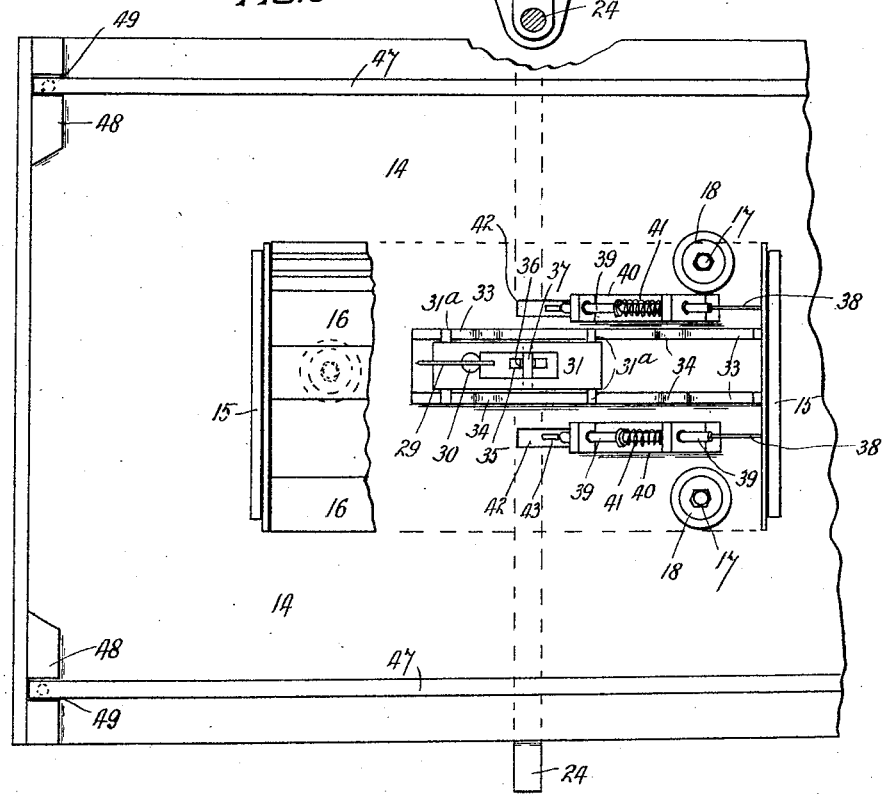
INVENTOR:
W. T. COWPERTHWAITE
BY: H van Oesteenel
ATTORNEY.

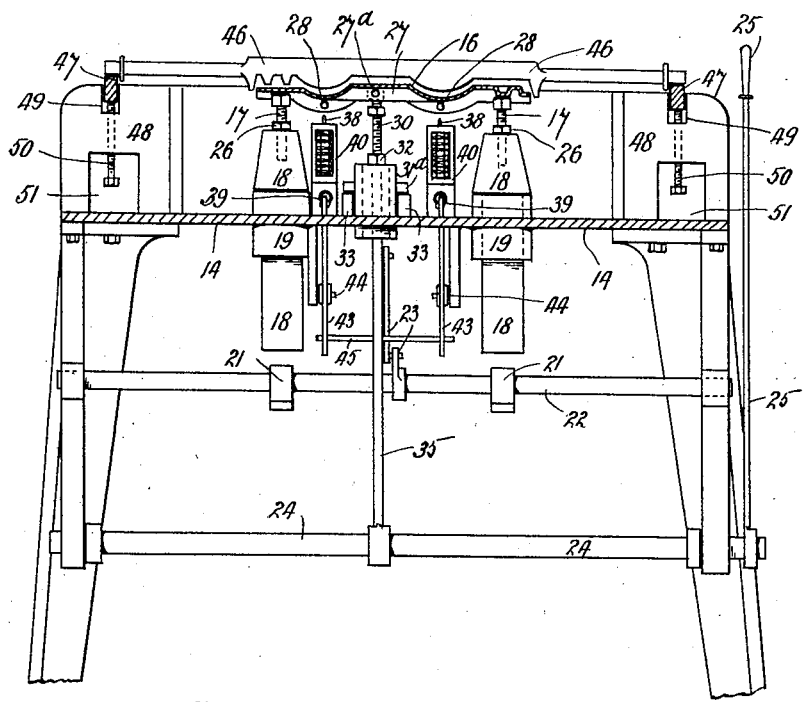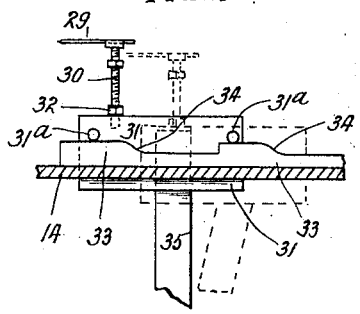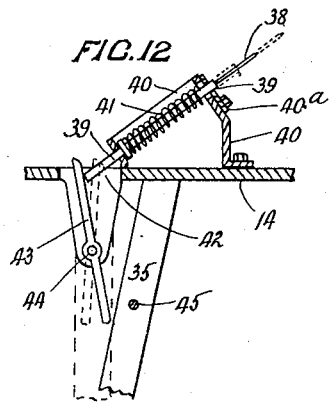

UNITED STATES PATENT OFFICE.

WILLIAM THOMAS COWPERTHWAITE, OF MOUNT EDEN, NEW ZEALAND.

MEANS FOR USE IN THE MANUFACTURE OF CONCRETE ROOFING TILE.

1,403,940.

Specification of Letters Patent. Patented Jan. 17, 1922.

Application filed March 6, 1918. Serial No. 220,756.

*To all whom it may concern:*

Be it known that I, WILLIAM THOMAS COWPERTHWAITE, subject of the King of Great Britain, residing at Mount Eden, Auckland, New Zealand, have invented a new and useful Means for Use in the Manufacture of Concrete Roofing Tile; and I do hereby declare the following to be a full, clear, and exact description of the same.

This invention relates to that known class of machine used for the moulding of roofing tiles and other like articles from concrete in which a pallet is employed to form the lower portion of the moulding die and the concrete is spread over such pallet by means of a strickler worked to and fro along the pallet and formed in such a manner as to shape the upper side of the tile. In these machines, the pallet is supported within a table frame and rests upon rods that are adapted to rise and lift the pallet so that it may be lifted out of the machine and which rods then receive the pallet for the next tile and are lowered to lower it into the table. The strickler is supported on guide bars extending longitudinally along the respective sides of the table and which position such strickler at the required height above the pallet (when the pallet is in position) to obtain the necessary thickness for the tile.

It also relates more particularly to a machine designed for use in the formation of roofing tiles shaped with flanges extending downwardly from the top and bottom edges of their undersurfaces, and with a transverse fillet piece extending transversely across its underside at a point between its two ends. The flange at the upper end is used to hang the tile on a roofing batten and is formed with nail apertures through which nails are passed to fasten it to such batten. The fillet is used to fasten the tile down on to the next batten by a tie wire and for that reason is formed with an aperture through it. The lower flange overlaps with the top edge of the next tile in the series.

Such tiles are also sometimes made with a flange extending transversely across the top edges of their upper surfaces so that the underneath flange on the bottom edges of the tiles next above them, may overlap and form a water seal.

The improvements now designed provide for the formation of these tiles and especially with the object of providing means whereby the nail holes in the flange of the tile and the tie wire aperture in the fillet may be formed. The improvements also provide an attachment whereby the top surface of the tile after moulding, and while still in the machine, may have a layer of red oxide or other coloring powder spread over it in a simple and even manner. Additional improvements relate to the manner of constructing and operating the pallet carrying rods, the means for regulating the height of the strickler guide bars and also a construction of strickler to provide for the formation of the flange on the upper side of the tile hereinbefore referred to.

The invention will be described with reference to the accompanying sheets of drawings in which I have shown the form of tile for which the machine is designed and its manner of fastening upon a roof and also the machine itself with its several adjuncts.

In such drawings:

Figure 1 is a plan of the improved tile.

Figure 2 is a longitudinal section thereof taken on the line 2—2 of Figure 1.

Figure 3 is a cross section thereof.

Figure 4 is a sectional view illustrating the manner of jointing the tiles longitudinally and the manner of securing them to the roof battens.

Figure 5 is a general side elevation of the whole moulding machine.

Figure 6 is a plan of the central portion thereof.

Figure 7 is a cross section of the color applying attachment.

Figure 8 is a longitudinal section, on an enlarged scale of the principal parts of the machine, the color applying attachment being removed.

Figure 9 is a plan thereof, portion of the pallet being shown broken away in order to clearly illustrate the mechanism beneath it.

Figure 10 is a cross section thereof.

Figure 11 is a detail view of the wire hole forming means.

Figure 12 is a similar view of the nail hole forming means.

Figure 13 is an elevation of the improved strickler.

The tile is formed of any of the approved shapes, such as that shown in the drawings by which it is provided with a flange A at its upper end that extends downwardly from the underside and engages the upper edge of the roofing batten B (Figure 4) to which it is nailed by nails driven through nail holes C formed in such flange, into the said batten, and by which it is also provided with a short downwardly extending flange D on its lower end, and with the usual grooves and ridges E and F extending along its upper side on one edge, and along its lower side on the other edge, to provide for the side overlap and lock with the adjacent tiles.

It may, in addition, be formed with the strip G extending along across the upper surface of the tile at its top end, such strip being made of a height approximating to the depth of the flange D and of any approved width. Its depth is uniform throughout the width of the tile, the strip following the cross sectional shape of the tile's surfaces so that when the lower end of one tile is laid over the upper end of another, the strip on the latter will engage closely with the undersurface of the former for the width of the tile while the flange D of the former will overlap the bottom edge of the strip and engage the top surface of the lower tile. This joint is clearly illustrated in Figure 4 and provides a double check against the possibility of rain beating up beneath the lap. When the lower end of the tile is secured in the manner shown in the drawings, the tightness of this joint is improved as it is drawn down on to the lower tile and held there by means of the tie wire H threaded through an aperture J formed in a cross fillet J' on the underside of the tile and then secured by nailing to the batten B.

The weather strip G does not extend across the entire width of the tile, as it ends where the side overlap with the adjacent tiles is provided for.

The machine for use in moulding the tiles and as illustrated in Figures 5 to 12 is formed with the usual table 14, having the vertically extending plates 15 thereon between which the longitudinal length of the pallet 16 extends and is supported on the rods 17 projecting up through the table top and engaging with suitable points of the underside of the pallet. Three of these rods are shown in the drawings and each is formed by a bolt headed screw that is screwed into a pillar 18 having an enlarged head, that, when the pallet is lowered, rests upon a flange 19 surrounding an aperture in the table top, down through which the pillar passes. The lower end of this pillar overlies a cam 21 fixed upon a countershaft 22 adapted to have partial rotation imparted to it by means of crank arms and connecting rod connections 23 with a lever 35 upon the main shaft 24 which main shaft is operated by the hand lever 25 situated at the side of the machine, as shown in Figures 5 and 10. The turning of the hand lever in one direction will therefore cause the several cams 22 to be raised and to engage the bottoms of the respective pillars 18 and push them upward so as to raise the pallet accordingly, while a movement of the hand lever in the opposite direction will allow such pillars to drop and the pallet to be lowered between the plates 15 in the manner required for moulding. The construction of these lifting rods with the bolt screw ends will enable the height to be accurately adjusted and to be varied to suit varying thicknesses or designs of pallets, each screw being locked by the lock nut 26.

The pallet 16, as shown in the drawings, is formed with a depression 27 extending across it to mould the fillet J' and this depression has the aperture 27$^a$ passing through it in a line parallel with the length of the pallet. To form the wire hole J, a pin is passed through this aperture 27$^a$ and lies there during the moulding operation and is afterwards withdrawn. The means shown provide for the insertion and withdrawal of such a pin simultaneously with the lowering of the pallet and the raising thereof by the operation of the hand lever 25 before described. Likewise the pallet upper end is formed with two apertures 28 passing up at an angle through the flange shaping portion thereof, and the nail holes C of the tile are formed by the placing of pins on these apertures during the moulding operation, such pins being afterwards withdrawn. These pins also are constructed and actuated so that on the operation of the hand lever 25 to lower the pallet, the pins will be pushed up into the respective apertures, and on the raising of such pallet, the pins will be withdrawn.

The former of these objects is effected by mounting a pin 29 in the upper end of a threaded rod 30 so that the pin extends in a horizontal plane, the rod 30 being screwed into a block 31 and locked therein by means of a lock nut 32. The height of the pin may thus be adjusted at will. The block 31 is arranged within a slot opening in the table top 14 so that it may move to and fro therein and is carried on pegs 31$^a$ projecting laterally from its sides and resting on the tops of vertical flanges 33 extending along the sides of the said slot. These flanges are each formed with downwardly curved depressions 34 in its top so positioned that when the block 31 is moved to the right hand (in the position shown in the drawings) the pegs 32 will drop down into such depressions and lower the level of the block, and when the block is moved in the reverse direction, the pegs will slide up the inclines of the depressions, on to the top of the flanges and thereby elevate the block. To actuate the block in this manner, a lever arm 35 is mounted on the main shaft 24 and passes up through an opening in the block, where a slot 36 on its end engages a cross pin 37 extending across such opening. This construction and the positions assumed by the block and its adjuncts are clearly shown in Figures 8 and 9 and the detail view Figure 11.

The movements of the block 31 will thus cause the pin 29 to be raised and then to travel horizontally, the block and the flanges 33 and their depressions being so positioned in relation to the pallet, that such a movement will cause the pin 29 to be raised and then to pass through the aperture 27$^a$ beforementioned, while the reverse movement will cause the pin to be withdrawn horizontally from such aperture and then lowered clear of the pallet. The movements of the lever 25, in addition to operating the cams 21 for lowering and raising the pallet, will operate the pin 29 and these synchronize to such an extent that in the lifting operation, the pin will move horizontally to free the pallet prior to the raising thereof, and in the lowering operation, the horizontal movement of the pin into the pallet will take place after the pallet is lowered.

The two pins 38 for passing into the respective apertures 28 to form the nail holes C are similarly constructed, mounted and operated, so that a description of one will apply to both. The pin is fixed in the end of a rod 39 that is mounted in a bearing frame 40 fastened to the table top so that the rod and pin extend at an angle in a line with the line of the aperture in the pallet when the pallet is lowered into the machine. The rod is adapted to move longitudinally in the bearing frame 40 so that the pin may be caused to project into such aperture and may be withdrawn therefrom, but is normally kept drawn down by means of a spring 41 surrounding the rod and in compression between a collar on the rod and the upper end of the bearing, as shown in Figure 12 where the bearing is drawn in section. The lower end of the rod 39 projects down through a slot 42 in the table and lies adjacent to the upper end of a lever 43 that is pivoted at 44 to a bearing extending down from the underside of the table and has its lower end projecting beyond its pivot point. A bar 45 projects laterally from the lever 35 and is adapted to engage the lower end of the lever 43 as the lever 35 travels through the latter portion of its movement, and by turning such lever 43 on its pivot, to push the rod 39 up and cause the pin 38 to project into the aperture 28. As the lever 35 commences its reverse movement, the rod 39 is freed so that the spring 41 acting thereon, will withdraw the pin 38 from the pallet, thereby leaving the pallet free to be raised. It will thus be seen that the pins 38 will not be projected upwards until the pallet has been lowered into the position to receive them and will be withdrawn prior to the pallet being raised. Means for adjusting the height of the rod and its relation to the nail holes are provided such consisting in an adjustable plate 40$^a$ on the front end of the bearing 40 and through which the rod passes.

The strickler 46 for forming the upper surface of the tile is shown as of the ordinary type in Figure 10 and this strickler is supported by means of the guide bars 47 arranged one on each side of the table at the required distance apart in the manner already known. In this invention however the guide bars are supported by means such that their height may be readily adjusted and thus the accurate thickness of the tile obtained. These means consist in a block 48 arranged at each corner of the table and formed with a slot 49 in its top, of a width such as to receive the guide bar and to hold it against any side movement. A screw pin 50 is provided to project upward into the bottom of this slot, such pin being screwed upwards from an opening 51 in the block so disposed as to allow of the pin being turned to regulate its height and consequently the level of the guide bar.

The strickler shown in Figure 13 is designed to allow for the formation of the strip G and to attain that object, it is made with two forming edges of similar design (instead of the usual single edge) one on its top and the other on its bottom. It is also so constructed that, when resting on its guide bars 47, one of the edges will occupy a different height relatively to the surface of the pallet on which the tile is moulded when such edge is turned downward, than the other when also turned down. Thus as the two edges are reciprocated above the pallet they will be adapted, while forming the same shape, to form different thicknesses of tile. Consequently to form the strip G the edge which is at the higher elevation from the pallet is used, while to form the rest of the tile, the edge that is closer to the pallet is used.

This variation is provided for either by arranging the two edges at different distances from a centre line extending through the handles 46$^a$, or by arranging the respective engaging surfaces of the supporting or runner blocks 46$^b$ at the outer ends of the handles, at different distances from such centre line. In either case, the edge for forming the strip, represented by 46$^c$ in the drawings, at its two ends, is made of equal distance away from the pallet as the corresponding portions of the other edge, represented by 46$^d$. This provides that in the formation of the strip its two ends will not extend across the portions of the tile used for overlapping with the tiles on both sides.

The attachment for spreading the coloring medium is shown in Figures 5 to 7 and comprises a tray 52 that is arranged on slides 53 between parallel side pieces 54 extending from one end of the table and fixed rigidly with the table. The tray is provided with a bottom 55 of perforated material and is made of such a length as to be capable of being drawn out to extend over the full length of the pallet, as shown by the dotted lines in Figure 5. It is also made of a width corresponding to the width of the pallet. A stirrer is mounted in the tray, such stirrer consisting in a blade 56 extending across the tray bottom and suspended from a cross piece 57 that rests on the sides of the tray. By moving this stirrer up and down, the coloring medium, generally finely powdered red oxide, a supply of which is placed within the tray, will be spread evenly over the surface of the wet moulded title so that it may be worked and absorbed into such surface by one or two operations of the strickler. The tray is pushed back while the tile is being moulded and is drawn out over such tile for use. When pushed back it lies above a shaft 58 having a removable plate 59 thereon to catch and save any material falling from the tray when in such a position.

I claim:—

In a device of the character described the combination of a pallet adapted to support in a horizontal position a plate of plastic material and having a flange forming portion having an aperture therein; a pin adapted to project through said aperture during the moulding operation and to be withdrawn after the moulding operation has been completed; a bearing frame beneath the pallet; a slide mounted thereon; a rod mounted on said slide to which the pin is fixed; a spring controlling said rod and keeping it in position to withdraw the pin from the aperture; a main shaft; a lever arm pivoted beneath the pallet and having its end engaging the back end of said rod; and means whereby said lever arm may be turned to push the rod outwardly, said means being controlled by the operation of the main shaft.

In testimony whereof, I have signed this specification in the presence of two subscribing witnesses.

WILLIAM THOMAS COWPERTHWAITE.

Witnesses:
E. BROOKE SMITH,
ETHEL FRANCES COURTNEY.